F. HODGKINSON.
SOLDERING STRIP.
APPLICATION FILED NOV. 24, 1917.

1,399,769.

Patented Dec. 13, 1921.

WITNESSES

INVENTOR.
Francis Hodgkinson.
BY
ATTORNEYS.

UNITED STATES PATENT OFFICE.

FRANCIS HODGKINSON, OF EDGEWOOD, PENNSYLVANIA, ASSIGNOR TO WESTINGHOUSE ELECTRIC & MANUFACTURING CO., A CORPORATION OF PENNSYLVANIA.

SOLDERING-STRIP.

1,399,769.  Specification of Letters Patent.  Patented Dec. 13, 1921.

Application filed November 24, 1917. Serial No. 203,852.

*To all whom it may concern:*

Be it known that I, FRANCIS HODGKINSON, a subject of the King of Great Britain and Ireland, and a resident of Edgewood, in the county of Allegheny and State of Pennsylvania, have made a new and useful Invention in Soldering-Strip, of which the following is a specification.

This invention relates to soldering, welding, or brazing strips, and has for an object to produce a strip which will facilitate the most desirable distribution of solder or brazing material in the finished article.

A further object is to produce a strip which is especially adapted to be employed in soldering, welding or brazing articles in which it is desirable to have an economic and uniform distribution of material.

A further object is to provide a solder strip which is composed of sections of relatively large cross-sections joined together by sections of relatively small cross-sections.

These and other objects are attained by means of the soldering strips embodying the features herein described and illustrated.

In the drawings accompanying and forming a part hereof:

Soldering wire or strips as commonly employed are strips of metal of substantially uniform heat conducting sectional area throughout their length. My invention consists in notching the wire or strip in such a manner that it will quickly melt in two at the places of reduced cross-section, thereby segregating a definite amount of material to make the soldered, welded or brazed joint. The term soldering will hereinafter be employed as meaning any of the operations commonly designated as soldering, brazing, welding or sweating.

My invention may advantageously be employed in connection with the soldering of turbine blades. For this work the strip is preferably notched at regular intervals so as to leave sufficient material between each two notches to solder one joint, such as the joint between a blade and the blade lashing. My invention not only promotes economy in the amount of soldering material used, but also insures a uniform distribution of soldering material, and therefore a uniform distribution of weight. The distribution of weight is of special importance in blades on rotating elements.

For some kinds of work, where adjacent joints are of unequal size, the soldering strip may be so notched as to leave proportionally varying amounts of material between the notches.

Figure 1:
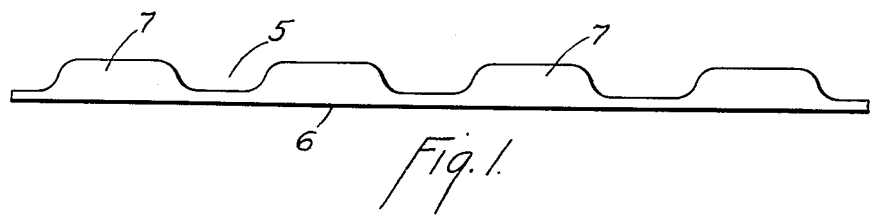
Figure 1 is a view of a section of a soldering strip embodying my invention.

In Fig. 1, I have shown a soldering wire or strip which has a series of notches 5 cut or formed in it on one side, so as to leave the other side 6 of the wire smooth. Between each two notches 5 is a section 7 of a certain definite mass which is just sufficient to properly solder a joint upon which it is to be used. As will be seen, each of the sections 7 are of the same size, and will be quickly detached from the rest of the strip by the melting away of the thin section at the bottom of the notches 5.

Figure 2:
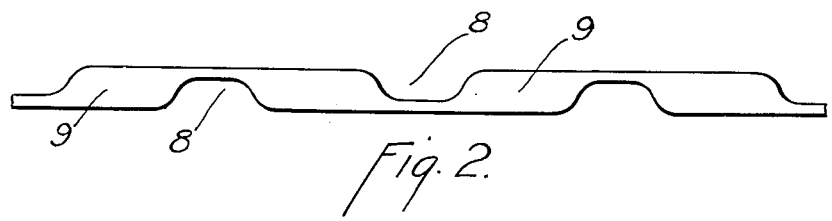
Fig. 2 is a view of another embodiment of my invention.

In Fig. 2, I have shown a soldering strip in which the notches or indentations 8 are alternately made on opposite sides of the strip, leaving sections 9 of substantially full cross-section between each two notches 8. As before, the sections 9 are all of the same size.

Figure 3:
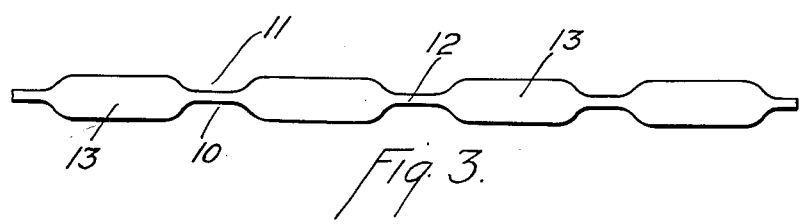
Fig. 3 is a view of a third embodiment of my invention.

In Fig. 3, I have shown a soldering strip in which the notches 10 and 11 made on both sides of the blade leave a thin tongue or web 12 in substantially the center of the strip to hold the sections 13 of substantially full cross-section together. In this embodiment of my invention I have also shown the section 13 as being of equal size.

Figure 4:
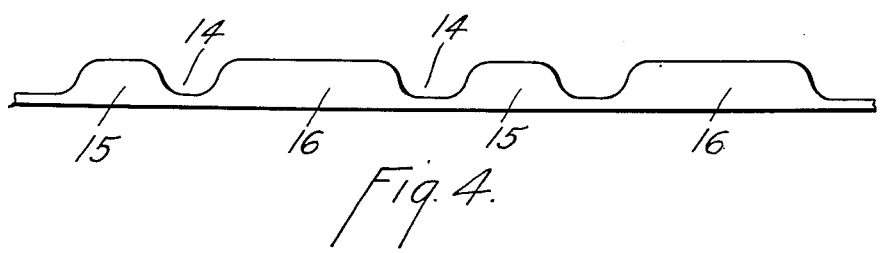
Fig. 4 is a view of an embodiment of my invention adapted for somewhat different work than the other embodiments illustrated.

In Fig. 4, I have illustrated a soldering strip which is adapted to be employed where adjacent joints require different amounts of soldering material. I have shown the strip as provided with notches or indentations 14 in the same manner as the strip illustrated in Fig. 1. However, the notches 14 are so spaced as to leave sections 15 and 16 of different mass between adjacent notches. As shown, the strip is made up of sections of two sizes, the section 15 being approximately half the size of the section 16. Such a strip is well adapted to be employed in soldering articles in which there are two joints to be soldered, one joint being of substantially twice the size of the other one.

Soldering strips made in accordance with my invention may be initially rolled with the proper notches or indentations, or they may be passed through a cogging machine or a suitable die, or the notches may be formed in any other manner desired.

While I have described and illustrated four embodiments of my invention, it will be apparent to those skilled in the art that various changes, modifications, additions and omissions may be made in the soldering strips described and illustrated in the drawings accompanying and forming a part hereof, without departing from the spirit and scope of my invention, as set forth by the appended claims.

What I claim is:

1. A soldering strip composed of sections of relatively large mass joined by elongated sections of relatively small mass and cross sectional area, whereby the latter sections are fused before the former when heat is applied to the strip.

2. The combination with a plurality of sections of solder of definite mass, of an elongated binder therefor normally holding them in form of a stick and adapted to be ruptured to release the said sections upon the application of heat to the stick insufficient to fuse the said sections.

3. The combination with a plurality of sections of solder of definite mass, of a fusible elongated binder therefor normally holding them in form of a stick and adapted to be fused to release the said sections upon the application of heat to the stick insufficient to fuse the said sections.

4. A soldering device comprising a strip of solder having a plurality of indentations spaced at intervals forming sections of fusible material having a length equal at least to their thickness and having less heat conducting sectional area than the mass of solder between them whereby such sections are fused before the intermediate masses of solder upon the application of heat to the strip.

In testimony whereof, I have hereunto subscribed my name this 22nd day of November, 1917.

FRANCIS HODGKINSON.

Witness:
C. W. McGHEE.